US007912422B2

(12) United States Patent
Rocken et al.

(10) Patent No.: US 7,912,422 B2
(45) Date of Patent: Mar. 22, 2011

(54) METHOD AND SYSTEM FOR DEMODULATION OF OPEN-LOOP GPS RADIO OCCULTATION SIGNALS

(75) Inventors: Christian Rocken, Boulder, CO (US); Sergey V. Sokolovskiy, Longmont, CO (US)

(73) Assignee: University Corporation for Atmospheric Research, Boulder, CO (US)

( * ) Notice: Subject to any disclaimer, the term of this patent is extended or adjusted under 35 U.S.C. 154(b) by 773 days.

(21) Appl. No.: 11/830,437

(22) Filed: Jul. 30, 2007

(65) Prior Publication Data
US 2008/0174487 A1 Jul. 24, 2008

Related U.S. Application Data

(60) Provisional application No. 60/820,915, filed on Jul. 31, 2006.

(51) Int. Cl.
*H04B 7/185* (2006.01)
(52) U.S. Cl. .................... 455/12.1; 455/427; 455/67.16; 455/3.02
(58) Field of Classification Search ................ 455/12.1, 455/67.11, 9, 13.1, 13.2, 67.13, 67.16, 552.1, 455/73, 556.1, 456, 427, 24, 65; 342/357.01, 342/357.05, 357.06, 357.12, 357.15, 352, 342/394, 357.16; 375/343, 355, 367
See application file for complete search history.

(56) References Cited

U.S. PATENT DOCUMENTS

| 5,434,847 | A | | 7/1995 | Kou | |
|---|---|---|---|---|---|
| 5,854,815 | A | * | 12/1998 | Lennen | 375/343 |
| 5,944,770 | A | * | 8/1999 | Enge et al. | 701/207 |
| 6,114,975 | A | * | 9/2000 | Guillard | 340/945 |
| 6,373,432 | B1 | * | 4/2002 | Rabinowitz et al. | 342/357.16 |
| 6,396,826 | B1 | * | 5/2002 | Ohlson et al. | 370/342 |
| 6,441,779 | B1 | * | 8/2002 | Bennett et al. | 342/357.11 |
| 6,720,916 | B2 | * | 4/2004 | Christensen et al. | 342/357.05 |
| 6,731,614 | B1 | * | 5/2004 | Ohlson et al. | 370/320 |
| 6,731,906 | B2 | * | 5/2004 | Sokolovskiy et al. | 455/12.1 |
| 2002/0155809 | A1 | * | 10/2002 | Sokolovskiy et al. | 455/12.1 |
| 2002/0158794 | A1 | * | 10/2002 | Christensen et al. | 342/357.05 |
| 2004/0032363 | A1 | * | 2/2004 | Schantz et al. | 342/127 |
| 2005/0159891 | A1 | * | 7/2005 | Cohen et al. | 701/213 |
| 2005/0192719 | A1 | | 9/2005 | Sheikh et al. | |

(Continued)

OTHER PUBLICATIONS

Rocken et al. Analysis and validation of GPS/MET data in the neutral atmosphere. Journal of Geophysical Research. vol. 102, Nox. D25. pp. 29,849-29,866. Dec. 27, 1997.

(Continued)

*Primary Examiner* — Tan Trinh
(74) *Attorney, Agent, or Firm* — Marsh Fischmann & Breyfogle LLP (57) ABSTRACT

Methods and systems for demodulation of open-loop GPS radio occultation signals are provided. An occulted GPS radio signal where the atmosphere-induced modulation on the phase is up to 180 degrees may be recorded by a radio occultation receiver. The radio signal may be concurrently received by a second receiver where the atmosphere-induced phase modulation is below 90 degrees and where the Navigation Data Message (NDM) bit sequence can be readily extracted. The extracted NDM bit sequence may be used to demodulate the occulted GPS radio signal and a 4-quadrant phase extractor may then be used to determine the phase and amplitude of the radio occultation signal. The phase and amplitude modulations after removal of NDM may be used for inversion, e.g., retrieval of the atmospheric parameters such as the bending angle, refractivity and deriving of the meteorological parameters.

43 Claims, 3 Drawing Sheets

U.S. PATENT DOCUMENTS

2007/0073486 A1 3/2007 Tillotson et al.
2007/0167188 A1* 7/2007 Linden .................... 455/552.1

OTHER PUBLICATIONS

Sokolovskiy et al. Tracking RO signals through the troposphere: Advances via realistic high-resolution simulations. 2nd Seminar on Radio Occultation (RO) with GNSS, ESA/ESTEC Noordwijk, The Netherlands. pp. 1-13. Jan. 20-21, 2000.

Sokolvskiy, Sergey V. Modeling and inverting radio occultation signals in the moist troposphere. Radio Science. vol. 36, No. 3. pp. 441-458. May/Jun. 2001.

Sokolvskiy, Sergey V. Tracking tropospheric radio occultation signals from low Earth orbit. Radio Science. vol. 36, No. 3. pp. 483-498. May/Jun. 2001.

Wickert et al. Atmosphere sounding by GPS radio occultation: First results from CHAMP. Geophysical Research Letters. Vol. No. 17. pp. 3263-3266. Sep. 2001.

Wickert et al. GPS radio occultation with CHAMP: Initial results. Proc. Beacon Satellite Symposium, Boston, MA. Jun. 4-6, 2001.

Beyerle et al. GPS Occultation Measurements with GPS/MET and CHAMP. 2001.

Ripley et al. A Dual-Frequency GNSS Sensor for Space Applications. Int. J. Satell. Commun. vol. 16. pp. 273-282. 1998.

Sokolovskiy et al. Tracking RO signals through the troposphere: Advances via realistic high-resolution simulations. 2nd Seminar on Radio Occultation (RO) with GNSS, ESA/ESTEC Noordwijk, The Netherlands, pp. 1-13. Jan. 20-21, 2000.

* cited by examiner

METHOD AND SYSTEM FOR DEMODULATION OF OPEN-LOOP GPS RADIO OCCULTATION SIGNALS

CROSS-REFERENCE TO RELATED APPLICATIONS

This application claims the benefit of U.S. Provisional Application No. 60/820,915 filed Jul. 31, 2006, which is incorporated herein by reference in its entirety.

FIELD OF THE INVENTION

This invention relates to demodulation of open-loop radio occultation signals in general and more particularly to methods and systems of demodulating Global Positioning System (GPS) radio occultation signals for the purpose of retrieval of atmospheric parameters.

BACKGROUND OF THE INVENTION

GPS radio occultation signals are produced when a GPS radio signal passes through a portion of the atmosphere and the signal experiences phase and amplitude modulations. A receiver positioned such that the portion of the atmosphere is between the GPS satellite and the receiver may record the occulted GPS radio signal. The phase and amplitude measurements can be processed to determine information about the atmosphere, such as bending angle and refractivity. Other parameters of the atmosphere, such as air density, temperature, moisture, pressure and ionospheric electron density may be derived from the phase and amplitude measurements.

The receivers are typically on board Low Earth Orbiting (LEO) satellites, but can also be on board satellites in different orbits or on other platforms such as airplanes, balloons, etc. The GPS satellites orbit the earth at an approximate altitude of 20,200 km while LEO satellites orbit the earth at an approximate altitude of 300-1,000 km. The relative motion of the GPS and LEO satellites results in frequent occultations of the GPS satellite as seen from LEO satellite.

Typically, Phase-Locked Loop (PLL) tracking is used to lock on to GPS signals. However, during occultations, fluctuations in both phase and amplitude may be much greater than can be tracked by PLL signal processing. To track the occulted radio signal under such conditions, open-loop tracking of the occulted radio signal may be used. Open-loop tracking is basically the raw sampling of the down converted complex signal. In open-loop tracking there is no feedback between the phase model used for the down conversion and the received signal. An advantage of open-loop tracking is that it is not susceptible to the complicated structure of the input signal and the input signal can be reliably recorded without distortion. One disadvantage of open-loop tracking is the low signal-to-noise ratio due to aliasing of the noise into the sampling frequency domain. To overcome this disadvantage, in the open-loop mode the radio occultation signal is down-converted with the phase model calculated without a feedback from the signal and then low-pass filtered. Such a system is described in U.S. Pat. No. 6,731,906 to Sokolovskiy and Rocken, the entirety of which is included herein by reference.

During PLL signal processing, the 90-degree phase Navigation Data Modulation (NDM) of the GPS radio signal may be removed in-receiver so that the effect of the occultation on the carrier phase can be determined. However, during open loop tracking without feedback, it is not generally possible to remove the NDM in-receiver. It has to be removed in the post-processing. The post-processing of the recorded open-loop radio occultation signal in order to determine its phase and amplitude described in U.S. Pat. No. 6,731,906 does not describe removal of the NDM.

SUMMARY OF THE INVENTION

The present invention relates to demodulation of open-loop GPS radio occultation signals. Embodiments described herein relate to demodulation of open-loop GPS radio occultation signals where the atmosphere-induced modulation on the phase of the open-loop GPS radio occultation signal is up to 180 degrees. The demodulated GPS radio occultation signals may be used to retrieve atmospheric parameters such as bending angle, refractivity, ionospheric electron density and derived meteorological parameters.

The present inventors have recognized that current methods produce errors where the atmosphere-induced modulation on the phase of the open-loop GPS radio occultation signal is greater than 90 degrees. Such modulation may, for example, occur during occultations in the moist lower troposphere of the tropical latitudes. When the phase modulation exceeds 90 degrees, current methods using a 2-quadrant phase extractor introduce half cycle slips and subsequent errors in the determination of atmospheric parameters.

Embodiments described herein include improved methods and apparatuses where the NDM is externally recorded (e.g., external to the radio occultation receiver) in a location where the NDM can be readily ascertained contemporaneously with the recording of the occulted GPS radio signal. The externally recorded NDM can then be applied for demodulation of the occulted GPS radio signal to determine the phase and amplitude of the radio occultation signal. The demodulation by externally recorded NDM bit sequence allows for applying a 4-quadrant phase extractor and thus allows for correct processing of radio occultation signals with larger magnitude of the atmosphere induced modulation on the phase (up to 180 degrees). This in turn may yield more accurate determination of atmospheric parameters than current known methods.

In accordance with one aspect of the present invention, a method of measuring phase and amplitude of a radio occultation signal is provided. The method may include receiving a radio occultation signal at a first receiver, where the radio occultation signal is a result of a data signal transmitted from a transmitter and where the data signal contains a bit sequence. The same data signal containing the bit sequence may also be received at a second receiver. The method may further include extracting the bit sequence from the data signal received at the second receiver and determining the phase and amplitude of the radio occultation signal based on the received radio occultation signal and the extracted bit sequence. At least a portion of the radio occultation signal may experience a phase modulation greater than 90 degrees. The determining of the phase and amplitude of the radio occultation signal may include applying a four-quadrant phase extractor.

In an embodiment, the transmitter may be a GPS satellite and the first receiver may be situated on a LEO satellite such that a signal transmitted from the GPS satellite to the first receiver passes through a section of the troposphere. Alternatively, the first receiver may be situated within the Earth's atmosphere, e.g., attached to a weather balloon, on board an airplane, or located on the Earth's surface. Where the transmitter is a GPS satellite, the data signal may be the L1 signal and/or the L2 signal. Accordingly, the bit sequence may be the NDM. Furthermore, the first receiver may receive the radio occultation signal in open-loop mode. The first receiver may sample the data signal at a predetermined sampling rate and store the sampled data signal in a memory.

In an arrangement, the second receiver may be situated on an orbiting satellite or within the Earth's atmosphere. The position of the second receiver relative to the transmitter may be such that any atmosphere-induced phase modulation of the data signal received at the second receiver is less than 90 degrees. The NDM may be extracted from the data signal received at the second receiver using known methods of NDM extraction.

The current method may further comprise transmitting the received radio occultation signal to a data analysis center and transmitting the bit sequence to the data analysis center. In such an embodiment, the determining step may be completed at the data analysis center. Alternatively, the bit sequence may be transmitted to the first receiver for processing.

In an embodiment, the method may further comprise inferring at least one atmospheric parameter along at least a portion of the path traveled by the radio occultation signal between the transmitter and the first receiver based at least in part on the determined phase and amplitude of the radio occultation signal. The at least one inferred atmospheric parameter may include, inter alia, bending angle and/or refractivity.

In another aspect, a method of processing a radio signal that contains information related to atmospheric conditions is provided. The method includes receiving a radio signal that has experienced a first occultation, recording the received radio signal, and transmitting the recorded radio signal for combination with a recording of at least a portion of the radio signal that has not experienced the first occultation.

In still another aspect, a satellite operable to process a radio signal that has undergone a first occultation is provided. The satellite may include a receiver operable to receive a radio signal that has experienced a first occultation, a recording module operable to record the received radio signal, and a transmitter. The transmitter may be operable to transmit the recorded radio signal. The recorded radio signal may be operable to be combined with a recording of at least a portion of the radio signal that has not experienced the first occultation. The satellite may further comprise a data storage device operable to store the recorded radio signal.

In yet another aspect, a method of processing a radio signal that contains information related to atmospheric conditions is provided. The method includes obtaining a radio signal transmitted from a GPS satellite during a time period and received by a first receiver, wherein the radio signal underwent occultation during the transmission and includes a radio occultation signal and the GPS NDM. The method further includes obtaining the GPS NDM transmitted from the GPS satellite during the time period from a source other than the first receiver, and determining the radio occultation signal from the radio signal received by the first receiver and from the GPS NDM obtained from the source other than the first receiver. The method may further include inferring at least one atmospheric parameter along at least a portion of a path of the transmission from the GPS satellite to the first receiver during the time period. In an embodiment, the determination of the radio occultation signal may include extracting phase lapse in four quadrants. The method may be performed on board a satellite, such as a satellite that includes the first receiver, or it may be performed at one or more appropriate Earth-based locations.

In still another aspect, an occultation signal processing system operable to extract a radio occultation signal from an occulted GPS radio signal is provided. The occultation signal processing system comprises a processor and a computer usable medium having computer program code embodied therein. The computer program code includes computer readable program code enabling the processor to read a data file including a GPS radio signal that has experienced occultation. Furthermore, the computer program code includes computer readable program code enabling the processor to read a data file including the NDM of the GPS radio signal. Also, the computer program code includes computer readable program code enabling the processor to determine a radio occultation signal from the GPS radio signal that has experienced occultation and the NDM of the GPS radio signal. In an embodiment, the GPS radio signal may have underwent occultation during transmission from a GPS satellite to a first receiver.

The occultation signal processing system may further include computer readable program code enabling the processor to infer at least one atmospheric parameter along at least a portion of a path traveled by the GPS radio signal that has experienced occultation. In an embodiment, the occultation signal processing system may further comprise computer readable program code enabling the processor to apply a four-quadrant phase extractor to the radio occultation signal. The occultation signal processing system may be located on board a satellite or it may be located at one or more appropriate Earth-based locations.

In another aspect, a method of inferring at least one atmospheric parameter along a signal path traveled by a GPS radio signal is provided. The method includes receiving information containing a radio occultation signal that resulted from a combination of a GPS radio signal that underwent occultation and the NDM of the GPS radio signal. The phase modulation of the GPS radio signal that underwent occultation may be greater than 90 degrees. The NDM of the GPS radio signal may have been obtained from a receiver different than a receiver that received the radio occultation signal. The occultation may have resulted from the GPS radio signal passing through a portion of the atmosphere along a signal path. The method of inferring at least one atmospheric parameter may further include inferring an atmospheric parameter along the signal path of the radio occultation signal.

Further areas of applicability of the present invention will become apparent from the detailed description provided hereinafter. The various features, arrangements and embodiments discussed above in relation to each aforementioned aspect may be utilized by any of the aforementioned aspects. It should be understood that the detailed description and specific examples, while indicating the preferred embodiment of the invention, are intended for purposes of illustration only and are not intended to limit the scope of the invention.

BRIEF DESCRIPTION OF THE DRAWINGS

For a more complete understanding of the present invention and further advantages thereof, reference is now made to the following Detailed Description taken in conjunction with the accompanying drawings, wherein.

DETAILED DESCRIPTION OF THE INVENTION

In the following description, an embodiment of the invention is set forth in detail in the context of a system for demodulation of open-loop GPS radio occultation signals. Indeed, the invention has a number of benefits and provides useful results in this regard. Accurately demodulated open-loop GPS radio occultation signals may be inverted to retrieve atmospheric parameters. However, it will be appreciated that various aspects of the present invention are not limited to such GPS-based applications. Accordingly, the following description should be understood as exemplifying the invention and not by way of limitation.

Figure 1:
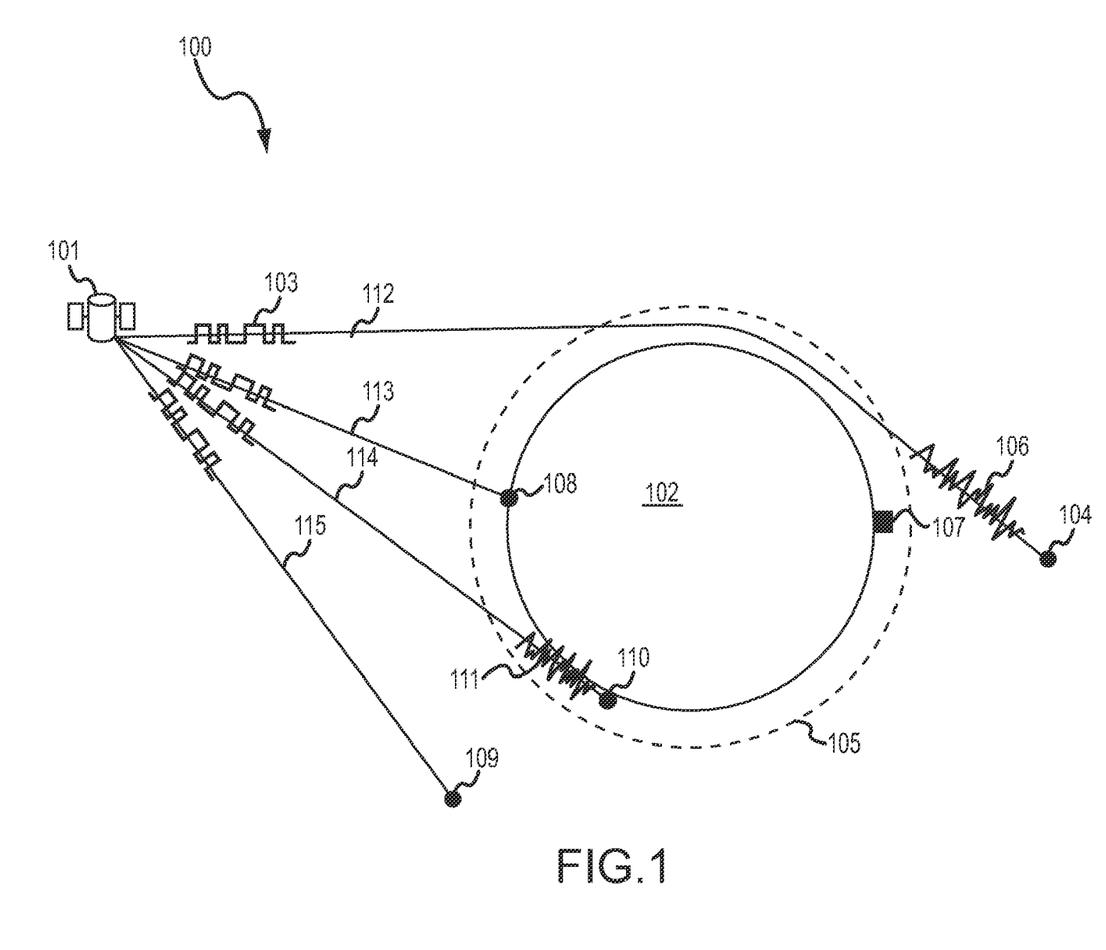
FIG. 1 is an illustration of an occultation determination system that uses satellite transmissions to determine atmospheric parameters.

FIG. 1 is an illustration of an embodiment of an occultation determination system 100 that includes a radio signal transmitter, such as GPS satellite 101, that transmits a radio signal 103 that includes the NDM imposed on a carrier signal. A portion of the radio signal 103 travels along path 112 that passes through a portion of the earth's atmosphere 105 (e.g., the lower troposphere). As it passes through the earth's atmosphere 105, the radio signal 103 is subject to occultation. The occulted radio signal that includes the NDM 106 may be received by a radio occultation receiver, such as may be on board a LEO satellite 104. Other portions of the radio signal 103 will travel along different paths such as paths 113, 114, and 115.

In a similar fashion, another radio occultation receiver 110 may be positioned closer to the earth's 102 surface and may be operable to measure and record an occulted radio signal 111, transmitted along path 114. The radio occultation receiver 110 may be ground based or it may be placed on an airborne platform, such as an aircraft or weather balloon. Although radio occultation receiver 110 is shown receiving the occulted radio signal 111 contemporaneously with the LEO satellite 104 receiving occulted radio signal 106, this is for illustration only. It will be understood that various occultation events may occur at various times as the GPS satellite 101 and the various radio occultation receivers 104, 110 are aligned properly to capture occulted radio signals.

Although the current embodiment is illustrated with the radio source being the GPS satellite 101, other sources of radio waves may be used. These other sources may include, for example, other satellite-based location determination system satellites (e.g., the planned Galileo system of the European Space Agency) and/or any other suitable source of radio waves.

The radio occultation receiver on board the LEO satellite 104 may be operable to receive and record the occulted radio signal 106, including the phase and amplitude of the occulted radio signal 106. When the atmosphere-induced phase modulation of the occulted radio signal 106 is below 90 degrees, known techniques (whether using PLL signal tracking or extracting the NDM from signals recorded using open-loop tracking during post-processing in a way similar to how this is done in PLL) may be used to remove the NDM from the signal. However, known techniques for removal of the NDM when the modulation on the phase is larger than 90 degrees can result in errors. The modulation on the phase may, for example, become larger than 90 degrees in occultations that occur when the radio signal 103 travels through the moist lower troposphere in the tropical latitudes.

To avoid errors associated with occultations where the modulation on the phase is larger than 90 degrees, first the occulted signal 106 is recorded using open-loop tracking. The recorded occulted radio signal 106 is then transmitted from the occultation receiver on board the LEO satellite 104 to a radio occultation data analysis center 107.

Simultaneously with the recording by the occultation receiver on board the LEO satellite 104, the signal 103 from the same GPS satellite 101 is recorded by another receiver, such as a receiver on board satellite 109. The signal received by the receiver on board satellite 109 travels a path 115 such that it is not subjected to significant occultation effects (e.g., the modulation on the phase is less than 90 degrees), and therefore the signal can be recorded in PLL mode and the NDM can be extracted directly from the signal. The recorded NDM is then transmitted from the satellite 109 to the radio occultation data analysis center 107. Alternatively, the simultaneous recording may be performed by a ground-based receiver 108 that can receive the signal 103 along a path 113 where the signal 103 is received at high elevation angle and thus not subjected to significant occultation effects (e.g., the modulation on the phase is less than 90 degrees).

The radio occultation data analysis center 107 may receive the occulted radio signal 106 transmitted from the radio occultation receiver on board the LEO satellite 104 and the simultaneously recorded NDM bit sequence from the satellite 109 and/or from the ground station 108. It is also possible to transmit the NDM directly from the ground station 108 or from the satellite 109 to LEO satellite 104 for on-orbit processing with complete data demodulation.

The NDM bit sequence may then be applied for demodulation of occulted radio signal 106 prior to an inversion (retrieval of atmospheric parameters along the signal path 112). The radio occultation signal is comprised of the carrier signal with the imposed atmosphere-induced modulation and NDM on the phase. The NDM bit sequence can be applied to correct the phase of the samples affected by NDM phase flips. The demodulation by externally recorded NDM bit sequence allows for applying 4-quadrant phase extractor to the radio occultation signal and thus it allows for correct processing of the occulted radio signal 106 when the signal 106 has a magnitude of the atmosphere-induced modulation on the phase up to 180 degrees.

Figure 2:
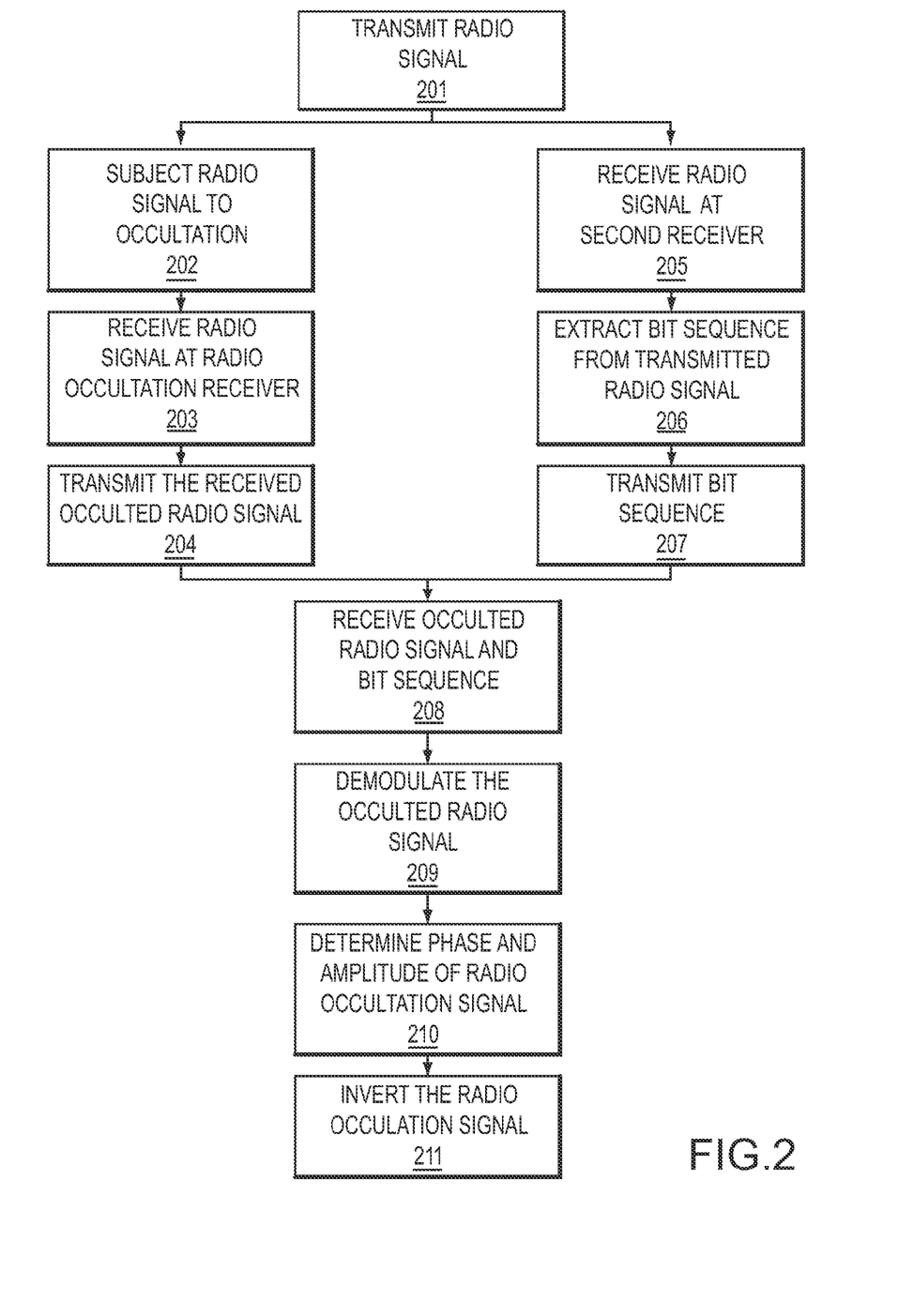
FIG. 2 is a flow diagram for the operation of a system for determining phase and amplitude of a radio occultation signal.

FIG. 2 illustrates, in the form of a flowchart, a methodology of determining the phase and amplitude of a radio occultation signal. The method of FIG. 2 will be described in conjunction with FIG. 3, which is a block diagram of a system 300 for determining the phase and amplitude of a radio occultation signal.

Figure 3:
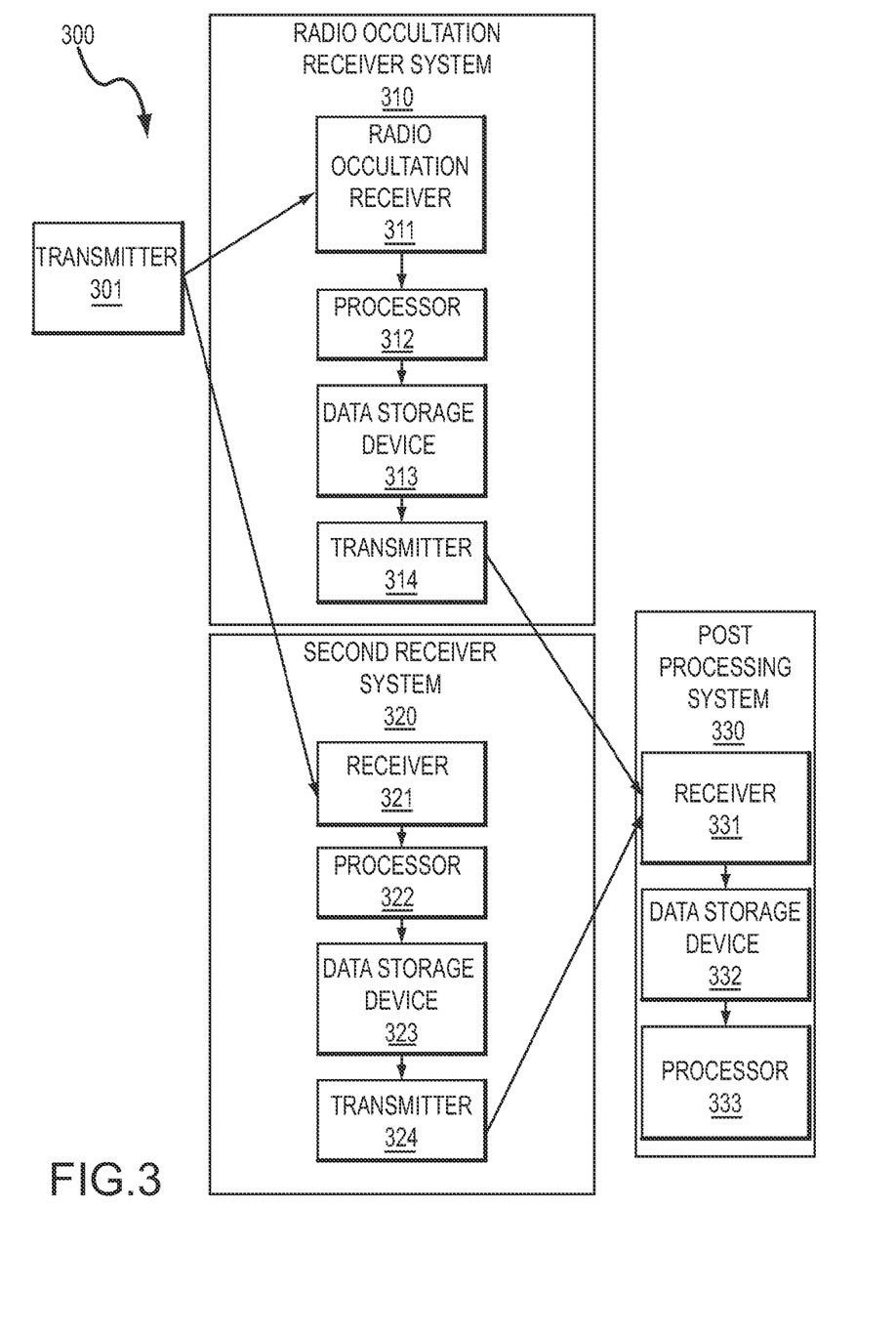
FIG. 3 is a block diagram of the architecture of a system for determining phase and amplitude of a radio occultation signal.

The first step of the method of determining the phase and amplitude of a radio occultation signal may be to transmit 201 a radio signal from a transmitter 301. The transmitter 301 may be an orbiting satellite, such as a GPS satellite. Where the transmitter 301 is a GPS satellite, the signal may include a phase modulation described by a bit sequence such as the NDM bit sequence and the signal may be on the L1 carrier frequency or the L2 carrier frequency.

The transmitted radio signal may be subjected 202 to occultation as it passes through a portion of the atmosphere. Although the current method will work with any level of occultation where the modulation of the phase is less than 180 degrees, the method is particularly advantageous when the modulation of the phase is between 90 degrees and 180 degrees. Such modulation may occur, for example, where the occultation occurs in the moist lower troposphere of tropical latitudes. The occultation signal may also be described as a function of the Height of Straight Line (HSL) between the transmitter 201 and a radio occultation receiver 311. A positive HSL is the minimum distance above the surface achieved by a straight line drawn between the transmitter 301 and the radio occultation receiver 311 and a negative HSL is the maximum depth below the surface achieved by a straight line drawn between the transmitter 301 and the radio occultation receiver 311. As HSL decreases, the amount of atmosphere that the radio signal passes through increases. Also, as HSL decreases, surface features (e.g., bodies of water and mountain ranges) may have greater effects on occultation.

The occulted radio signal that includes the NDM may then be received 203 by a radio occultation receiver 311 of the radio occultation receiver system 310. The radio occultation receiver 311 may be on board a LEO satellite or based in the atmosphere, e.g., on aircraft, on the ground, etc. The radio occultation receiver 311 may be operable to track the occulted radio signal using open-loop tracking. The radio occultation receiver 311 may be controlled by a processor 312 that may also perform signal-processing tasks. Open-loop tracking is raw sampling of the complex radio occultation signal after down-conversion and low-pass filtering (e.g., integration) in the radio occultation receiver system 310. The frequency model for the down-conversion is calculated in-receiver by the processor 312 during an occultation by use of the real time navigation solution and a model of bending angles in the atmosphere. As opposed to PLL, in open-loop tracking, the frequency model is not based on the feedback from the received radio occultation signal. This not only eliminates the tracking errors but allows tracking of both setting and rising occultations. After the down-conversion, a low sampling rate, for example between 10 and 100 Hz (e.g., 50 Hz), may be sufficient for recording the radio occultation signal affected by the tropospheric propagation effects. However, the L1 signal carries the [0, 180 degrees] phase modulations, the 1.023 MHz pseudo-random noise Course Acquisition (C/A) code modulation and the 50 Hz NDM. The C/A code modulation may be removed in-receiver prior to sampling. This may be accomplished by synchronizing the C/A code replica with the radio occultation signal by use of the real-time navigation solution, the neutral atmospheric delay model (e.g., the integrated atmospheric Doppler model), and an ionospheric group delay model.

The radio occultation receiver system 310 may include a data storage device 313 operable to store the received and processed occulted radio signal that includes the NDM. The received occulted radio signal may then be transmitted 204 by a transmitter 314 of the radio occultation receiver system 310 to a post processing system 330. The transmission 204 may occur immediately after processing or it may be delayed until an appropriate time, for example when the LEO satellite containing the radio occultation receiver system 310 moves into radio contact with an appropriate receiver. Alternatively, the data can be processed without further transmission by the processor 312 located with the occultation receiver 311.

As noted, the first step of the method of determining the phase and amplitude of a radio occultation signal may be to transmit 201 a radio signal from a transmitter 301. Simultaneously with the receiving of the occulted radio signal by the radio occultation receiver system 310, the radio signal may also be received 205 by a receiver 321 of a second receiver system 320. The receiver 321 may be on board a satellite (e.g., a LEO satellite). Alternatively, the receiver 321 may be ground based or may be located in the atmosphere, e.g., on a weather balloon, on the ground, etc. The second receiver system 320 may be situated relative to the transmitter 301 such that the signal received by the second receiver system 320 has a modulation of the phase of less than 90 degrees. This allows recording the radio signal in PLL mode and extracting 206 the NDM bit sequence by a processor 322 of the second receiver system 320. Decoding of the NDM bit sequence is not required for the present method. The NDM bit sequence may be stored on a data storage device 323 of the second receiver system 320. The NDM bit sequence may be transmitted 207 by a transmitter 324 of the second receiver system 320 to the post processing system 330. Alternatively, the second system receiver 320 may transmit 207 the radio signal as received and the NDM bit sequence may be extracted in post-processing. Alternatively transmitter 324 could send the data directly to a receiver collocated with processor 312 for on-orbit processing.

A receiver 331 of the post processing system 330 may receive 208 both the occulted radio signal from the radio occultation receiver system 310 and the NDM bit sequence from the second receiver system 320. The receiver 331 may be a radio receiver capable of receiving signals directly from the transmitters 314 and 324. Alternatively, the receiver 331 may be a device capable of receiving the occulted radio signal and NDM bit sequence via other methods, such as over the Internet. For example, both the occulted radio signal and the NDM bit sequence may be received by a receiving station or receiving stations remotely located from the post-processing system 330. The information may then be forwarded to the receiver 331 of the post-processing system 330 via an Internet connection.

The received occulted radio signal that includes the NDM and the NDM bit sequence may be stored on a data storage device 332 of the post-processing system 330. A processor 333 may then access the stored occulted radio signal and the NDM bit sequence and use the NDM bit sequence to demodulate 209 the occulted radio signal that includes the NDM.

The demodulation 209 of the occulted radio signal by externally recorded NDM bit sequence allows for applying 4-quadrant phase extractor to determine 210 the phase and amplitude of the radio occultation signal. Applying a 4-quadrant phase extractor allows for correct processing of the radio occultation signal allowing connection of the phase between samples by resolving cycle ambiguities when the phase lapse between samples is less than 180 degrees. This is in contrast to using a 2-quadrant phase extractor, which could introduce half cycle slips and subsequent errors in the determination of atmospheric parameters.

The data storage device may include a computer readable medium containing computer program code. The computer program code may enable many of the functions of the post-processing system described herein. For example, the program code may include programs that enable the processor 333 to read and process the occulted radio signal and the NDM bit sequence. Furthermore, the program code may enable the processor to use the NDM bit sequence to demodulate the occulted radio signal. The program code may also enable the processor 333 to apply the 4-quadrant phase extractor to determine the phase and amplitude of the radio occultation signal.

After the phase and amplitude of the radio occultation signal are determined, the radio occultation signal may be used for inversion 211 to determine signal bending angles and atmospheric refractivity. This inversion may be performed in the same way as performed on PLL signals where the phase lapse is less than 90 degrees. Other atmospheric parameters may be derived from the inverted radio occultation signal including, but not limited to, atmospheric moisture levels, pressure, temperature, and ionospheric electron density. Information obtained from the inversion of the radio occultation signal may be assimilated into Numerical Weather Prediction models. The inversion 211 may be performed by the processor 333 of the post-processing system 330. Alternatively, the inversion could also be performed by processor 312 if the NDM is available from transmitter 324.

Alternatively, the inversion may be performed by a system separate from the post-processing system 330. For example, the post-processing system 330 may process the occulted radio signal from the radio occultation receiver system 310 and the NDM bit sequence from the second receiver system 320 to determine the radio occultation signal. The radio occultation signal may then be distributed to various users who may receive the radio occultation signal and infer atmospheric parameters based on the received radio occultation signal.

While various embodiments of the present invention have been described in detail, it is apparent that further modifications and adaptations of the invention will occur to those skilled in the art. For example, the methods and systems for demodulation of radio occultation signals are generally described herein with respect to the GPS system in orbit around the earth. However, the systems and methods could be used with other radio sources and around other planets or celestial bodies. However, it is to be expressly understood that such modifications and adaptations are within the spirit and scope of the present invention.

What is claimed:

1. A method of measuring phase and amplitude of a radio occultation signal, said method comprising:
    receiving a radio occultation signal at a first receiver, wherein said radio occultation signal is a result of a data signal transmitted from a transmitter, wherein said data signal contains a bit sequence;
    receiving said data signal at a second receiver;
    extracting said bit sequence from said data signal received at said second receiver; and
    determining the phase and amplitude of said radio occultation signal based on said received radio occultation signal and said extracted bit sequence.

2. The method of claim 1, wherein said radio occultation signal has experienced a phase modulation greater than 90 degrees.

3. The method of claim 1, wherein said first receiver is located on a LEO satellite.

4. The method of claim 1, wherein said first receiver is located within the Earth's atmosphere.

5. The method of claim 1, wherein said first receiver is located on the Earth's surface.

6. The method of claim 1, wherein said radio occultation signal has passed through a section of the troposphere.

7. The method of claim 1, wherein said transmitter is a GPS satellite.

8. The method of claim 7, wherein said data signal is an L1 signal from a GPS satellite.

9. The method of claim 7, wherein said data signal is an L2 signal from a GPS satellite.

10. The method of claim 7, wherein said bit sequence is the GPS NDM.

11. The method of claim 10, wherein the GPS NDM is extracted from said data signal received at said second receiver.

12. The method of claim 7, wherein said radio occultation signal has passed through a section of the troposphere.

13. The method of claim 12, further comprising inferring at least one atmospheric parameter along at least a portion of the path traveled by said radio occultation signal between said transmitter and said first receiver based at least in part on said determined phase and amplitude of said radio occultation signal.

14. The method of claim 13, wherein said atmospheric parameter includes at least one of bending angle and refractivity.

15. The method of claim 14, wherein said radio occultation signal is received in open-loop mode.

16. The method of claim 15, further comprising:
    sampling said data signal at said first receiver at a predetermined sampling rate; and
    storing said sampled data signal in a memory.

17. The method of claim 16, wherein said radio occultation signal has experienced a phase modulation greater than 90 degrees.

18. The method of claim 17, wherein said determining step includes applying a four-quadrant phase extractor.

19. The method of claim 18, wherein said first receiver is located on a LEO satellite.

20. The method of claim 18, wherein said first receiver is located within the Earth's atmosphere.

21. The method of claim 18, wherein said first receiver is located on the Earth's surface.

22. The method of claim 1, wherein said radio occultation signal is received in open-loop mode.

23. The method of claim 1, further comprising:
    sampling said data signal at said first receiver at a predetermined sampling rate; and
    storing said sampled data signal in a memory.

24. The method of claim 1, wherein said second receiver is located on an orbiting satellite, and wherein said first receiver is located on an orbiting satellite.

25. The method of claim 1, wherein said second receiver is located within the Earth's atmosphere.

26. The method of claim 1, wherein atmosphere-induced phase modulation of said data signal received at said second receiver is less than 90 degrees.

27. The method of claim 1, wherein said determining step includes applying a four-quadrant phase extractor.

28. The method of claim 1, further comprising transmitting said bit sequence to said first receiver for processing.

29. The method of claim 1, further comprising inferring at least one atmospheric parameter along at least a portion of the path traveled by said radio occultation signal between said transmitter and said first receiver based at least in part on said determined phase and amplitude of said radio occultation signal.

30. The method of claim 29, wherein said atmospheric parameter includes at least one of bending angle and refractivity.

31. The method of claim 30, wherein said radio occultation signal has experienced a phase modulation greater than 90 degrees.

32. The method of claim 31, wherein said determining step includes applying a four-quadrant phase extractor.

33. The method of claim 32, wherein said radio occultation signal is received in open-loop mode.

34. The method of claim 33, further comprising:
    sampling said data signal at said first receiver at a predetermined sampling rate; and
    storing said sampled data signal in a memory.

35. The method of claim 34, wherein said radio occultation signal has passed through a section of the troposphere.

36. The method of claim 35, wherein atmosphere-induced phase modulation of said data signal received at said second receiver is less than 90 degrees.

37. The method of claim 36, further comprising:
    transmitting said received radio occultation signal to a data analysis center; and
    transmitting said bit sequence to said data analysis center, wherein said determining step is completed at said data analysis center.

38. The method of claim 1, wherein said step of receiving said radio occultation signal at said first receiver comprises receiving said radio occultation signal directly from said transmitter, and wherein said step of receiving said data signal at said second receiver comprises receiving said data signal directly from said transmitter.

39. The method of claim 1, wherein said radio occultation signal received at said first receiver experienced a phase modulation greater than 90 degrees, and wherein atmosphere-induced phase modulation of said data signal received at said second receiver is less than 90 degrees.

40. A method of measuring phase and amplitude of a radio occultation signal, said method comprising:
   receiving a radio occultation signal at a first receiver, wherein said radio occultation signal is a result of a data signal transmitted from a transmitter, wherein said data signal contains a bit sequence;
   receiving said data signal at a second receiver;
   extracting said bit sequence from said data signal received at said second receiver;
   determining the phase and amplitude of said radio occultation signal based on said received radio occultation signal and said extracted bit sequence;
   transmitting said received radio occultation signal to a data analysis center; and
   transmitting said bit sequence to said data analysis center, wherein said determining step is completed at said data analysis center.

41. A method of measuring phase and amplitude of a radio occultation signal, said method comprising:
   receiving a radio occultation signal at a first receiver, wherein said radio occultation signal is a result of a data signal transmitted from a transmitter, wherein said data signal contains a bit sequence, wherein said step of receiving said radio occultation signal at said first receiver comprises receiving electromagnetic radiation from said transmitter;
   receiving said data signal at a second receiver, wherein said step of receiving said data signal at said second receiver comprises receiving electromagnetic radiation from said transmitter;
   extracting said bit sequence from said data signal received at said second receiver; and
   determining the phase and amplitude of said radio occultation signal based on said received radio occultation signal and said extracted bit sequence.

42. The method of claim 41, wherein said radio occultation signal received at said first receiver experienced a phase modulation greater than 90 degrees, and wherein atmosphere-induced phase modulation of said data signal received at said second receiver is less than 90 degrees.

43. The method of claim 42, wherein said first receiver is located on a first orbiting satellite, and wherein said second receiver is located on a second orbiting satellite.

\* \* \* \* \*

UNITED STATES PATENT AND TRADEMARK OFFICE
CERTIFICATE OF CORRECTION

| | | |
|---|---|---|
| PATENT NO. | : 7,912,422 B2 | Page 1 of 1 |
| APPLICATION NO. | : 11/830437 | |
| DATED | : March 22, 2011 | |
| INVENTOR(S) | : Rocken et al. | |

It is certified that error appears in the above-identified patent and that said Letters Patent is hereby corrected as shown below:

Column 1, line 12, insert the following paragraph:

--GOVERNMENT SUPPORT

The present invention was made with Government support under Cooperative Agreement No. ATM-9732665 awarded by the National Science Foundation. The Government has certain rights in this invention.--

Signed and Sealed this
Nineteenth Day of July, 2011

David J. Kappos
*Director of the United States Patent and Trademark Office*